July 28, 1925.

J. D. WEIN 1,547,985

FUEL HEATING AND MIXING APPARATUS

Filed Aug. 9, 1921

July 28, 1925.                                                                  1,547,985
J. D. WEIN
FUEL HEATING AND MIXING APPARATUS
Filed Aug. 9, 1921                    2 Sheets-Sheet 2
*Fig. 2.*
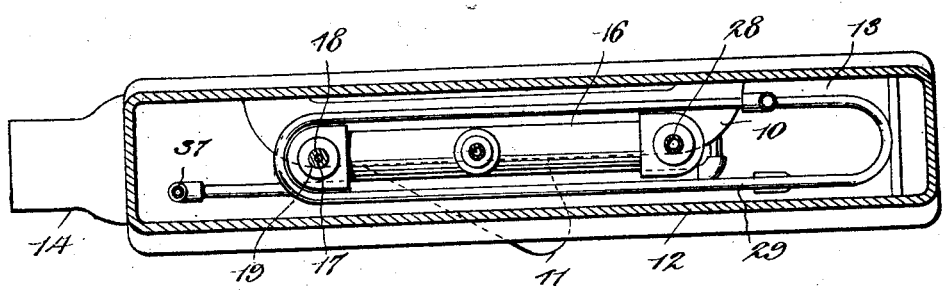
*Fig. 3.*
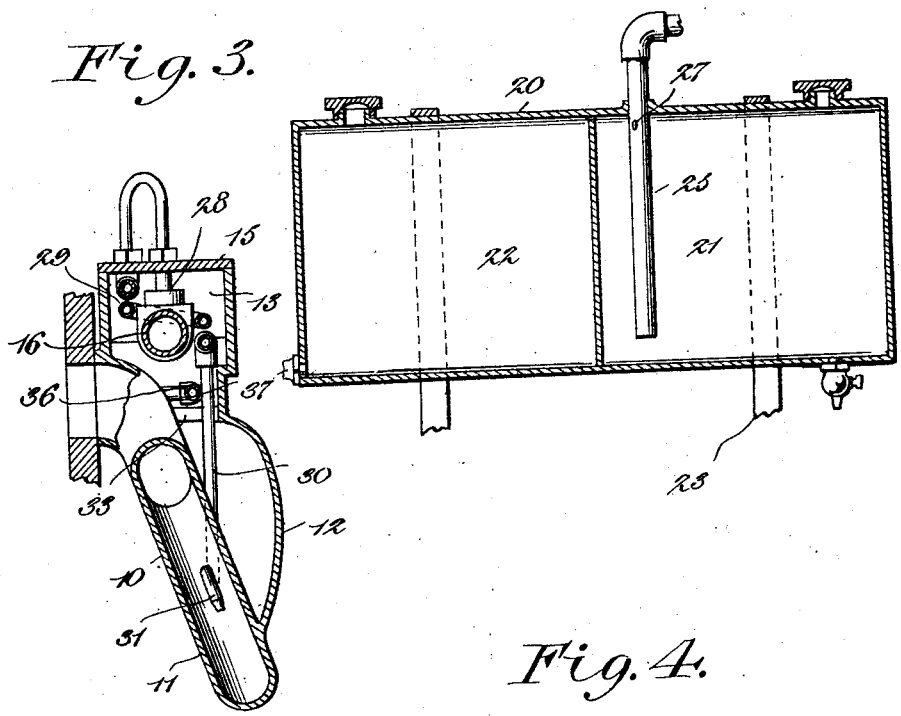
*Fig. 4.*
Jens D. Wein,
INVENTOR
BY Victor J. Evans
ATTORNEY
WITNESS:

Patented July 28, 1925.

1,547,985

UNITED STATES PATENT OFFICE.

JENS D. WEIN, OF TROY, NEW YORK.

FUEL HEATING AND MIXING APPARATUS.

Application filed August 9, 1921. Serial No. 491,056.

*To all whom it may concern:*

Be it known that I, JENS D. WEIN, a citizen of the United States, residing at Troy, in the county of Rensselaer and State of New York, have invented new and useful Improvements in Fuel Heating and Mixing Apparatus, of which the following is a specification.

This invention relates to fuel heating and mixing apparatus of the class such as is shown in United States Letters-Patent Number 1,343,858, granted to me.

Some of the objects of the present invention are: to improve the apparatus disclosed in the above mentioned patent; to simplify the apparatus; to maximize the heating efficiency; to produce generally a more thoroughly efficient apparatus of this character. With these and other objects in view the invention resides in the particular provision and the relative disposition of parts hereinafter more fully described and illustrated in the accompanying drawings, in which:

Figure 2 is a horizontal sectional view taken on the line 2—2, Figure 1.

Figure 3 is a transverse sectional view taken on the line 3—3, Figure 1.

Figure 4 is a sectional view through the gasoline and water supply tank.

Figure 1:
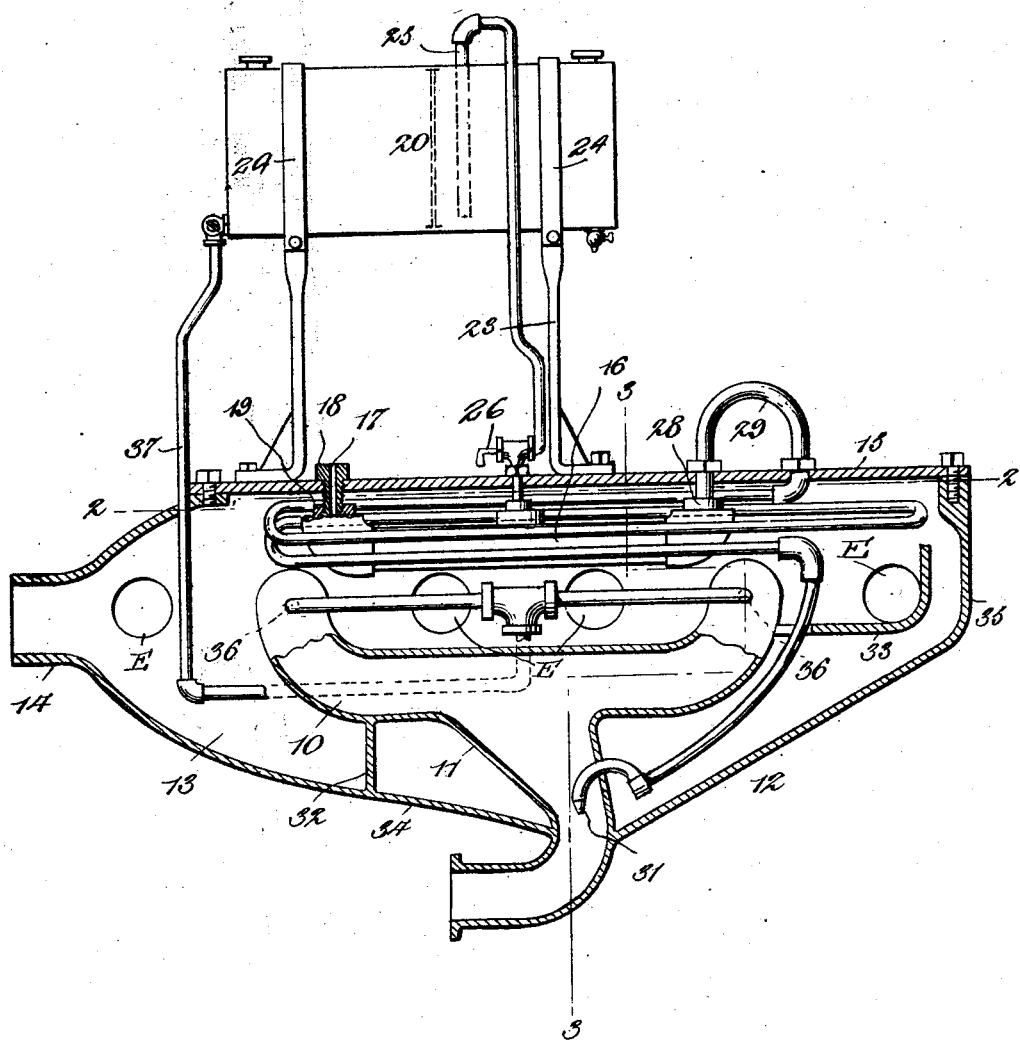
Figure 1 is a vertical longitudinal sectional view.

Referring now more particularly to the several views of the drawings for details, it will be manifest that, the apparatus of the present invention will include a manifold 10 which is connectable to an internal combustion engine so as to be in communication with the intake ports thereof. The manifold 10 has a neck or the like 11, to which the fuel supply pipe is connected. It is of course understood that with the present apparatus heavy oils, petroleums and kerosene may be utilized for fuel. A casing 12 surrounds the manifold 10 and it is sufficiently large relatively to the said manifold as to define a chamber 13 about the said manifold 10. The chamber 13 is in communication with the exhaust ports of the engine when the casing 12 is properly bolted in place by virtue of exhaust inlets E. The casing 12 has an outlet 14. The casing 12 is also provided with a cover plate 15 which when removed from securement to the casing affords access to the interior thereof. A receptacle 16 is arranged interiorly of the casing 12 and it is disposed in the chamber 13 above the manifold 10 so as to be susceptible to the heat of the exhaust gases which enter the chamber 13 from the engine cylinders. The receptacle 16 receives air and water. The water received by the receptacle 16 is generated into steam due to the heating of the receptacle, and the generated steam and air, by the suction of the engine, are introduced to the incoming fuel to be mixed therewith to vaporize the same more thoroughly. Air is admitted into the receptacle 16 through the inlet 17 in a member 18 adapted for screw threading engagement with the tapped end 19 of said receptacle. A tank 20 is utilized for the storing of water and fuel and the same is divided into two compartments, a compartment 21 for water and a compartment 22 for gasoline. The tank is preferably supported in place above the casing 12 on a support or the like 23. Bands 24 are used to hold the tank 20 in place—the ends of the bands being connected to bolts arranged in the support 23. The water compartment 21 is connected to the receptacle 16 by a tube 25 which extends into the said compartment nearly to the bottom thereof. The tube 25 is equipped with a needle valve 26 for regulating the flow of water from the compartment 21 to the receptacle. A vent 27 in the tube 25 prevents siphoning of the water and allows the proper suction action of the engine in drawing the water from the compartment 21. The tapped end 28 of the receptacle 16 is connected to a tube-coil 29 which surrounds the said receptacle. The tube-coil receives the steam generated in the receptacle 16 and the air admitted to the said receptacle through the inlet 17, to be superheated. The tube-coil 29 is connected to the neck 11 of the manifold 10 by a tube 30 having a nozzle 31 which is disposed in said neck 11.

In order to confine the hot exhaust gases from the engine cylinders about the receptacle 16 and the tube-coil 29 partitions 32 and 33 are provided. The partition 32 is arranged between the wall 34 of the casing 12 and the left extension of the manifold 10, whereas, the partition 33 is arranged between the right extension of the manifold 10 and the end wall 35 of the casing 12 but spaced from the said wall 35. Thus it will be manifest that the hot exhaust gases are concentrated against the receptacle 16 and the tube-coil 29 prior to egress through the outlet 14.

In order that the engine may be primed for the starting thereof there is provided nozzles 36 which project into the intake ports and the nozzles 36 are fed from the supply of gasoline in the compartment 22 of the tank 20 through the intervention of a pipe 37.

By admitting air and water into the receptacle 16 and by compelling them as conditioned therein to pass to the tube coil it is possible to more thoroughly preheat the same to produce a vapor for introduction in the manifold. This vapor serves to more thoroughly vaporize the incoming fuel mixture from the carburetor before its passage into the cylinders of an engine.

While the apparatus disclosed in the mentioned patent granted to me is satisfactory, it has been found that the changes, which by comparison with my other disclosure may be noted, improve the apparatus generally and materially so that more thorough efficiency is attained.

What is claimed is:

1. A fuel heating and mixing apparatus comprising a manifold connectable to the intake and exhaust ports of an internal combustion engine and having an inlet, a casing defining a chamber surrounding said manifold, the said casing having exhaust inlets for the passage of the exhausts gases of the engine to the chamber and an exhaust outlet in communication with said chamber, a supply tank having a water compartment and a fuel compartment, a receptacle arranged within said chamber, a conduit communicating with the water compartment and said receptacle, and an air inlet leading to said receptacle whereby water and air are adapted to be preheated in said receptacle by the exhaust gases in said chamber, a conduit communicating with the fuel compartment and the manifold and extending through said chamber, and a coil pipe leading from said receptacle to a point adjacent the inlet port of said manifold substantially as and for the purpose specified.

2. A heating and mixing apparatus comprising a manifold connectable to the intake ports of an internal combustion engine and having an inlet, a casing defining a chamber surrounding said manifold, the said casing having exhaust inlets for the passage of exhaust gases of the engine to the chamber, and an exhaust outlet in communication with said chamber, a supply tank having a water compartment and a fuel compartment, a receptacle having a vent, a pipe connecting the water compartment with the receptacle to establish communication therebetween, a pipe coil communicating with said receptacle, a pipe connecting the coil with the inlet of the manifold for the introduction of vapor thereto, said receptacle and said coil being disposed in said chamber, a regulating valve in the pipe between the fuel compartment and the receptacle, a conduit communicating with the fuel compartment and the manifold, said conduit extending through said chamber whereby fuel may be introduced into said manifold for mixture with the vapor.

In testimony whereof I hereby affix my signature.

JENS D. WEIN.